US008639391B1

(12) United States Patent
Alberth, Jr. et al.

(10) Patent No.: US 8,639,391 B1
(45) Date of Patent: Jan. 28, 2014

(54) SYSTEMS, DEVICES, AND METHODS FOR AUTOMATION AND ENERGY MANAGEMENT

(71) Applicants: William P. Alberth, Jr., Prairie Grove, IL (US); Seang Yong Chau, San Jose, CA (US); David K Hartsfield, Poway, CA (US); Scott A. Steele, Poway, CA (US)

(72) Inventors: William P. Alberth, Jr., Prairie Grove, IL (US); Seang Yong Chau, San Jose, CA (US); David K Hartsfield, Poway, CA (US); Scott A. Steele, Poway, CA (US)

(73) Assignee: Green Edge Technologies, Inc., Poway, CA (US)

( * ) Notice: Subject to any disclaimer, the term of this patent is extended or adjusted under 35 U.S.C. 154(b) by 0 days.

(21) Appl. No.: 13/672,534

(22) Filed: Nov. 8, 2012

(51) Int. Cl.
G05D 3/12 (2006.01)
G05D 5/00 (2006.01)
G05D 9/00 (2006.01)
G05D 11/00 (2006.01)
G05D 17/00 (2006.01)
G05D 23/00 (2006.01)
G08B 21/00 (2006.01)
G01N 31/00 (2006.01)

(52) U.S. Cl.
USPC ........... 700/286; 700/292; 700/295; 340/657; 702/31

(58) Field of Classification Search
USPC .............. 700/286, 292, 295; 340/657; 702/31
See application file for complete search history.

(56) References Cited

U.S. PATENT DOCUMENTS

| 5,760,558 | A | 6/1998 | Popat |
| 5,877,957 | A | 3/1999 | Bennett |
| 6,112,127 | A | 8/2000 | Bennett |
| 6,385,495 | B1 | 5/2002 | Bennett |
| 6,400,996 | B1 | 6/2002 | Hoffberg et al. |
| 6,418,424 | B1 | 7/2002 | Hoffberg et al. |
| 6,912,429 | B1 * | 6/2005 | Bilger ............................ 700/19 |
| 7,336,192 | B2 | 2/2008 | Aisa |
| 7,339,466 | B2 | 3/2008 | Mansfield et al. |
| 7,406,353 | B2 | 7/2008 | Bennett |
| 7,480,746 | B2 | 1/2009 | Simon et al. |
| 7,813,831 | B2 | 10/2010 | McCoy et al. |
| 7,860,679 | B2 | 12/2010 | Rouhier et al. |
| 7,865,252 | B2 | 1/2011 | Clayton |
| 8,024,073 | B2 | 9/2011 | Imes et al. |
| 8,094,034 | B2 | 1/2012 | Patel et al. |
| 8,134,310 | B2 | 3/2012 | Wacknov et al. |
| 8,183,995 | B2 | 5/2012 | Wang et al. |
| 8,185,250 | B2 | 5/2012 | Sato |
| 8,190,275 | B2 | 5/2012 | Chang |
| 8,214,671 | B2 | 7/2012 | Boss et al. |
| 8,234,363 | B1 | 7/2012 | Kuo |
| 8,248,230 | B2 | 8/2012 | Covaro et al. |
| 8,334,784 | B2 | 12/2012 | Patel et al. |
| 2002/0035404 | A1 | 3/2002 | Ficco et al. |
| 2002/0149891 | A1 | 10/2002 | Neiger et al. |
| 2004/0138981 | A1 * | 7/2004 | Ehlers et al. .................... 705/36 |
| 2007/0155349 | A1 * | 7/2007 | Nelson et al. ................. 455/128 |

(Continued)

Primary Examiner — Kavita Padmanabhan
Assistant Examiner — Jason Lin
(74) Attorney, Agent, or Firm — Bookoff McAndrews, PLLC

(57) ABSTRACT

A building automation system including a controller, at least one outlet for providing electrical energy to one or more electrical devices, at least one sensor for detecting one or more characteristics of the electrical devices, and a communication link configured to allow communication between the controller and other components of the system, wherein the controller is configured to control (e.g., interrupt, change, adjust, terminate, increase, and/or meter) the supply of power to the at least one outlet based, in part, on one or more characteristics of the electrical device.

30 Claims, 8 Drawing Sheets

100

(56) References Cited

U.S. PATENT DOCUMENTS

| | | | |
|---|---|---|---|
| 2009/0072985 A1* | 3/2009 | Patel et al. ................... 340/657 |
| 2010/0171430 A1 | 7/2010 | Seydoux | |
| 2010/0188229 A1 | 7/2010 | Nhep | |
| 2010/0280667 A1* | 11/2010 | Steinberg ..................... 700/276 |
| 2011/0010019 A1* | 1/2011 | Shloush et al. ............... 700/295 |
| 2011/0313582 A1* | 12/2011 | van Megen et al. ........... 700/292 |
| 2012/0271472 A1* | 10/2012 | Brunner et al. ............... 700/295 |
| 2013/0030732 A1* | 1/2013 | Shetty et al. .................. 702/62 |

* cited by examiner

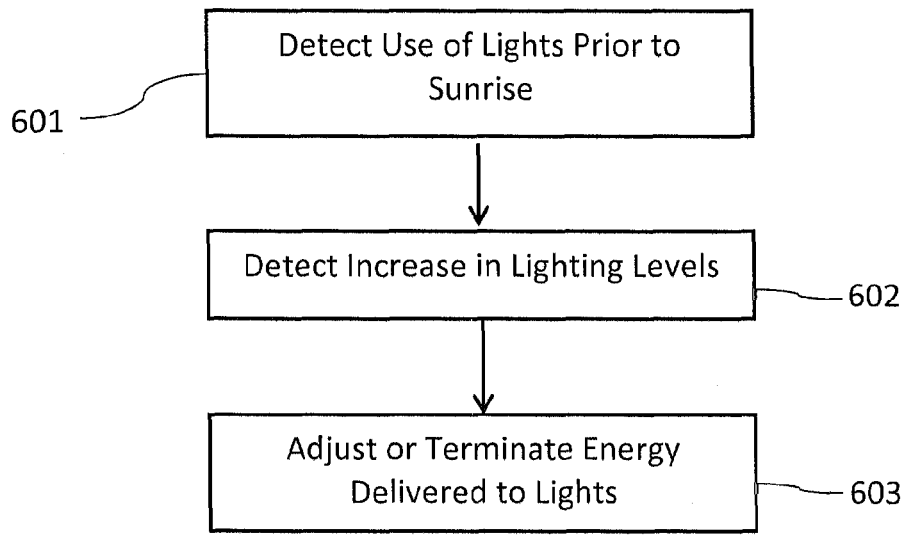
600  Figure 6a
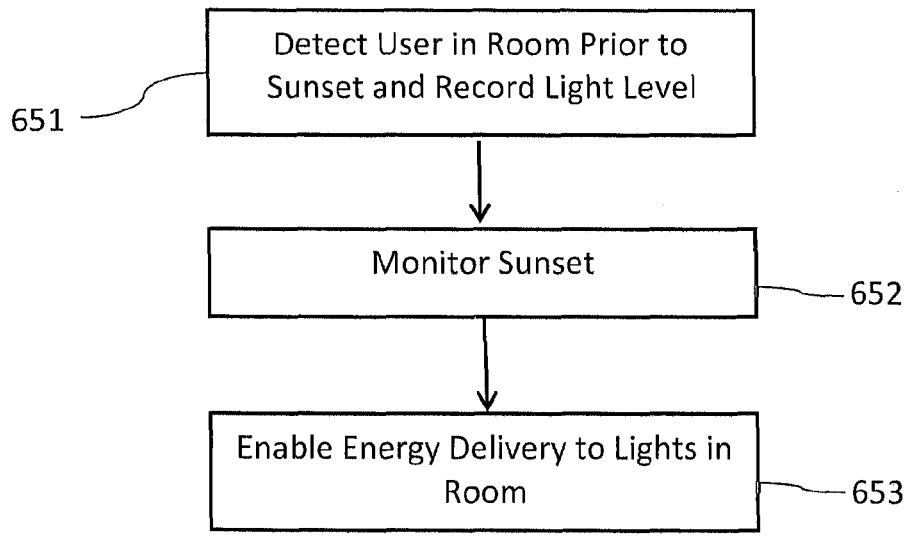
650  Figure 6b

SYSTEMS, DEVICES, AND METHODS FOR AUTOMATION AND ENERGY MANAGEMENT

DESCRIPTION OF THE INVENTION

1. Field of the Invention

Embodiments of the present disclosure are directed to systems, devices, and methods for automation and energy management. More particularly, the present disclosure is directed to sensing and controlling the energy consumption of electrical devices based on one or more characteristics of the devices.

2. Background of the Invention

Conventional home automation systems have been available in the marketplace for many years. For example, the internationally-known X10 standard was one of the first standards commercialized for automating systems within a home, office, or school. The X10 standard enables commands to be sent over the existing wiring in a structure, so that a controller can send messages to a controlled device. That is, one or more devices may communicate with one another over existing electrical wiring using the X10 standard. Controllers and controlled devices can be paired by manually setting the address or identifying information on the respective devices.

Recent efforts to conserve energy have sparked additional interest in home automation. The existing and available solutions in the prior art, however, require large expenditures of capital and/or expert domain knowledge to facilitate installation. The current known prior art solutions are further limited by the fact that conventional outlets function in the same way regardless of the load (e.g., the particular electrical device) operably coupled to the outlet. In other words, a conventional outlet functions exactly the same regardless of whether a refrigerator, a clock radio, an incandescent light, a vacuum cleaner, a life support device, or another electrical device is plugged into the outlet. Such inflexible and non-discriminatory outlet set-up is not cost efficient, and does not optimize energy conservation.

There are solutions in the prior art to differentiate the type of loads connected to an electrical network. For example, U.S. Pat. No. 8,094,034, entitled "Detecting Actuation of Electrical Devices Using Electrical Noise Over a Power line," discloses apparatus and methods for detecting electrical device actuation using electrical noise over a power line.

SUMMARY OF THE INVENTION

Embodiments of the present disclosure are directed to systems, devices, and methods for intelligently controlling one or more energy consuming devices in a structure, including, but not limited to, a home, office, hospital, sporting complex, or school.

In one embodiment, a building automation system including a controller and at least one outlet for providing electrical energy to one or more electrical devices, wherein the at least one outlet may include at least one sensor, and a communication link configured to allow communication between the controller and other components of the system; wherein the controller is configured to control (e.g., interrupt, change, adjust, terminate, increase and/or meter) the supply of power to the outlet, based at least in part, on one or more characteristics of the electrical devices. One skilled in the art would understand that the characteristic may include, but is not limited to, the identity or type of the device, the power consumption of the device, a power consumption rate of the device, a change in the power consumption of the device, the historical or recorded data of the device including but not limited to power consumption data of the device versus time, usage or power consumption of the device relative to external factors or environment such as weather, light or sunlight condition, and the presence of people or plants in the building, usage or power consumption of the device relative to the usage of other devices, preset or predetermined user settings, or otherwise any other general mechanical or electrical characteristic of the device.

Various embodiments of the building automation system may include one or more of the following features: the outlet may include an adaptor configured to be operably coupled with a preexisting electrical outlet; the at least one sensor may include a plurality of sensors; the at least one sensor may include one of a power monitor, motion sensor, light sensor, sound sensor, camera, humidity sensor and a temperature sensor; the outlet may include a microprocessor; one of the controller and microprocessor may be configured to receive power consumption data for the one or more electrical devices from the power monitor; one of the controller and microprocessor may be configured to compare the received power consumption data to the predetermined power consumption data of known electrical devices; one of the controller and microprocessor may be configured to identify the one or more electrical devices based on the comparison of the received power consumption data to the predetermined power consumption data of known electrical devices; the at least one outlet may be configured to detect an electrical noise in a power line generated by the one or more electrical devices; at least one outlet may be configured to communicate the detected electrical noise to the controller; the controller may be configured to compare the detected electrical noise to electrical noise data of known electrical devices; the controller may be configured to identify the one or more electrical devices based on the comparison of the detected electrical noise to electrical noise data of known electrical devices; the sensor may be configured to detect a radiofrequency signal; a switch operably coupled to the controller and the outlet; the controller may be configured to communicate with the Internet; the communication link may be configured to allow wireless communication between the outlet and the controller; and the controller may be configured to control (e.g., interrupt, change, adjust, terminate and/or meter) the delivery of electrical energy to at least one outlet based at least in part on an input from at least one sensor regarding, e.g., one or more characteristics of the electrical device.

In another embodiment, a building automation system may include a controller an outlet for providing electrical energy to an electrical device, wherein the outlet is an adaptor configured to be connected to an existing electrical outlet in the building. The outlet may include a power monitor configured to monitor a power consumption of the electrical device. The outlet may also include one of a motion sensor, light sensor, camera, sound sensor, humidity sensor and temperature sensor. Further, the outlet may include an antenna configured to allow wireless communication between the controller and the outlet, and the controller may be configured to control (e.g., interrupt, change, adjust, terminate and/or meter) delivery of electrical energy to at least one outlet, based at least in part, on an input from at least one sensor regarding, e.g., one or more characteristics of the electrical device.

Various embodiments of the building automation system may include one or more of the following features: the outlet may be configured to detect an electrical noise in a power line generated by the electrical device; the building automation system may be configured to identify the electrical device based on a comparison of the monitored power consumption of the electrical device to power consumption of known devices; the building automation system may be configured to identify the electrical device based on a comparison of the detected electrical noise to electrical noise of known devices; the outlet may be further configured to detect radiofrequencies; a switch operably coupled to the controller and the outlet; and the switch may be configured to control (e.g., interrupt, change, adjust, terminate and/or meter) the supply of electrical energy to the outlet, based at least in part, on the identity of the device determined by the electrical noise comparison.

In another embodiment, a building automation system may include a controller and an outlet for providing electrical energy to an electrical device. The outlet may include a power monitor configured to monitor a power consumption of the electrical device and at least one sensor. The building automation system may be configured to identify the electrical device based on a comparison of the monitored power consumption of the electrical device to power consumption of known devices, and the controller may be configured to control delivery of electrical energy to at least one outlet, based at least in part, on the comparison of the monitored power consumption.

Various embodiments of the building automation system may include one or more of the following features: the outlet may be an adaptor configured to be connected to an existing electrical outlet in the building; at least one sensor may be configured to sense one or more of motion, light, and temperature, and the adaptor may be configured to control delivery of electrical energy to at least one outlet, based at least in part, on one or more input of the sensor.

In a further embodiment, a building automation system may include a controller and an outlet for providing electrical energy to an electrical device, wherein the outlet is configured to detect an electrical noise in a power line generated by the electrical device. Furthermore, the building automation system may be configured to identify the electrical device based on a comparison of the detected electrical noise to electrical noise of known devices, and the controller may be configured to control delivery of electrical energy to at least one outlet, based at least in part, on the comparison of the electrical noises.

Various embodiments of the building automation system may include one or more of the following features: a sensor configured to sense at least one of motion, light, humidity, temperature, and sound; and the outlet may be an adaptor configured to be connected to an existing electrical outlet in the building, and the adaptor may be configured to control delivery of electrical energy to at least one outlet, based at least in part, on one or more input of the sensor.

In a further embodiment, a building automation system may include a controller; at least one outlet for providing electrical energy to one or more electrical devices; at least one sensor for detecting at least one characteristic of the one or more electrical devices; and a communication link configured to allow communication between the controller and other components of the system. The controller may be configured to control delivery of electrical energy to the at least one outlet, based at least in part on the at least one characteristic of the one or more electrical devices.

Various embodiments of the building automation system may include one or more of the following features: the at least one sensor is a power monitor for monitoring or determining the electrical energy delivered to the one or more electrical devices; the controller is configured to receive power consumption data for the one or more electrical devices from the said power monitor; and the controller may be further configured to control the delivery of electrical energy to the at least one outlet, based at least in part on the power consumption data for the one or more electrical devices; the at least one sensor may be a motion sensor, a camera, light sensor, sound sensor, humidity sensor, or a temperature sensor; at least one microprocessor configured to receive and compare the power consumption data of the one or more electrical devices to predetermined power consumption data of electrical devices; one of the controller and microprocessor may be configured to identify the one or more electrical devices based on the comparison of the received power consumption data to predetermined power consumption data of electrical devices; at least one outlet may be an adaptor configured to be connected to an existing electrical outlet in a building; the at least one outlet may be directly wired to an electrical device that is directly connected to a power grid of the building; the at least one sensor may be configured to detect an electrical noise generated by the one or more electrical devices and the electrical noise may be communicated to the controller; at least one microprocessor that is configured to receive and compare the electrical noise to predetermined electrical noise data of electrical devices; wherein one of the controller and the at least one microprocessor is further configured to identify the one or more electrical devices based on the comparison of the electrical noise to the predetermined electrical noise data of electrical devices; wherein the controller is configured to control delivery of electrical energy to the outlet, based at least in part on the identity of the one or more electrical devices; the controller may be configured to communicate with the Internet; the communication link may be configured to allow wireless communication between the controller and other components of the system; a switch operably coupled to the controller and the at least one outlet; wherein the switch is configured to control delivery of electrical energy to the at least one outlet based on an input from the at least one sensor communicated to the controller; and the sensor may be further configured to detect radiofrequencies.

In another embodiment, a building automation system may include a controller configured to communicate with the Internet; at least one outlet for providing electrical energy to one or more electrical devices; at least one sensor for detecting at least one characteristic of the one or more electrical devices, wherein the sensor may be configured to generate an output based on a sensed condition, wherein the sensor output may be communicated to the Internet; wherein at least one characteristic or an identity of the one or more electrical devices may be determined based on the sensor output communicated to the Internet; wherein the at least one characteristic or the identity of the one or more electrical devices may be communicated to the controller; and a communication link configured to allow communication between the controller and other components of the system; wherein the controller may be configured to control delivery of electrical energy from the at least one outlet, based at least in part on the characteristic or the determined identity of the one or more electric devices.

Various embodiments of the building automation system may include one or more of the following features: the sensor may be a power monitor, a motion sensor, a light sensor, a sound sensor, a humidity sensor, a camera, or a temperature sensor; the sensor output communicated to the Internet may be compared to the predetermined characteristics of other electrical devices; the identity of the one or more electrical devices may be determined based on the comparison of the sensor output to the predetermined characteristics of other electrical devices; the controller may be configured to control delivery of electrical energy to the at least one outlet, based at least in part on the determined identity of the one or more electrical devices; a switch operably coupled to the controller and the outlet; and the switch may be configured to control delivery of electrical energy from the at least one outlet based on an output from the at least one sensor communicated to the controller.

In a further embodiment, a building automation system may include a controller; a plurality of electrical devices, wherein the plurality of electrical devices may include a first electrical device and a second electrical device; at least one outlet for providing electrical energy to the plurality of electrical devices; one or more sensors for detecting at least one characteristic of at least the first electrical device; and a communication link configured to allow communication between the controller and other components of the system, wherein the controller is configured to receive a first sensor output for at least one characteristic of the first electrical device; wherein the controller may be configured to control the second electrical device, based at least in part on the received characteristic of the first electrical device.

Various embodiments of the building automation system may include one or more of the following features: the sensor may include a motion sensor, a light sensor, a sound sensor, a humidity sensor, a camera, or a temperature sensor; the sensor may include a power monitor, wherein the power monitor is configured to monitor a power consumption of at least one of the plurality of devices; the system may further comprise at least one microprocessor configured to compare the power consumption of at least the first device to predetermined power consumption data of electrical devices; wherein one of the controller and microprocessor may be configured to identify at least the first electrical device based on the comparison of the power consumption of at least the first device to predetermined power consumption data of electrical devices; the controller may be configured to communicate with the Internet; the communication link may be configured to allow wireless communication between the controller and other components of the system; wherein the first sensor output may be communicated to the Internet; wherein at least one characteristic or an identity of the first electrical device may be determined and communicated to the controller based on the first sensor output communicated to the internet; wherein the controller is configured to control the delivery of energy to the second electrical device, based at least in part on the characteristic or identity of the first electrical device; a switch operably coupled to the controller and the outlet; wherein the switch is configured to control delivery of electrical energy to the second electrical device, based at least in part on the characteristic of the first electrical device.

In a still further embodiment, a building automation system may include a controller; a plurality of electrical devices, wherein the plurality of electrical devices may include a first electrical device and a second electrical device; a first outlet for providing electrical energy to the first electrical device; a second outlet for providing electrical energy to the second electrical device; one or more sensors configured to detect at least one characteristic of each of the plurality of electrical devices; and a communication link configured to allow communication between the controller and the other components of the system; wherein the controller may be configured to control the delivery of electrical energy from the first outlet based at least in part on the at least one characteristic or an identity of the first electrical device; wherein the controller may be configured to control the delivery of electrical energy from the second outlet based at least in part on the at least one characteristic or identity of the second electrical device.

Various embodiments of the building automation system may include one or more of the following features: the sensor may be a motion sensor, a camera, light sensor, sound sensor, a humidity sensor a camera, or a temperature sensor; sensor may be a power monitor configured to detect a plurality of electrical noises respectively generated by each of the plurality of the electrical devices; the building automation system may be configured to identify each of the electrical devices based on a comparison of the detected electrical noises to predetermined electrical noise data of electrical devices; the sensor may be a power monitor that is configured to output data relating to the power consumption of each of the electrical devices; the system may be further configured to identify the electrical devices based on a comparison of the monitored power consumption of the electrical devices to predetermined power consumption data of electrical devices; the communication link may be configured to allow wireless communication between the controller and other components of the system; a switch operably coupled to the controller and the outlets; the switch may be configured to interrupt a supply of electrical energy from the first outlet based at least in part on one of the characteristic or identity of the first electrical device; and the switch may be configured to interrupt a supply of electrical energy from the second outlet based at least in part on one of the characteristic or the identity of the second electrical device.

It may be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

FIGS. 6a and 6b depict flowcharts of exemplary methods for maintaining a constant level of light with an embodiment of an automation system disclosed herein, in accordance with the present disclosure;

DETAILED DESCRIPTION OF THE EMBODIMENTS

Figure 1:
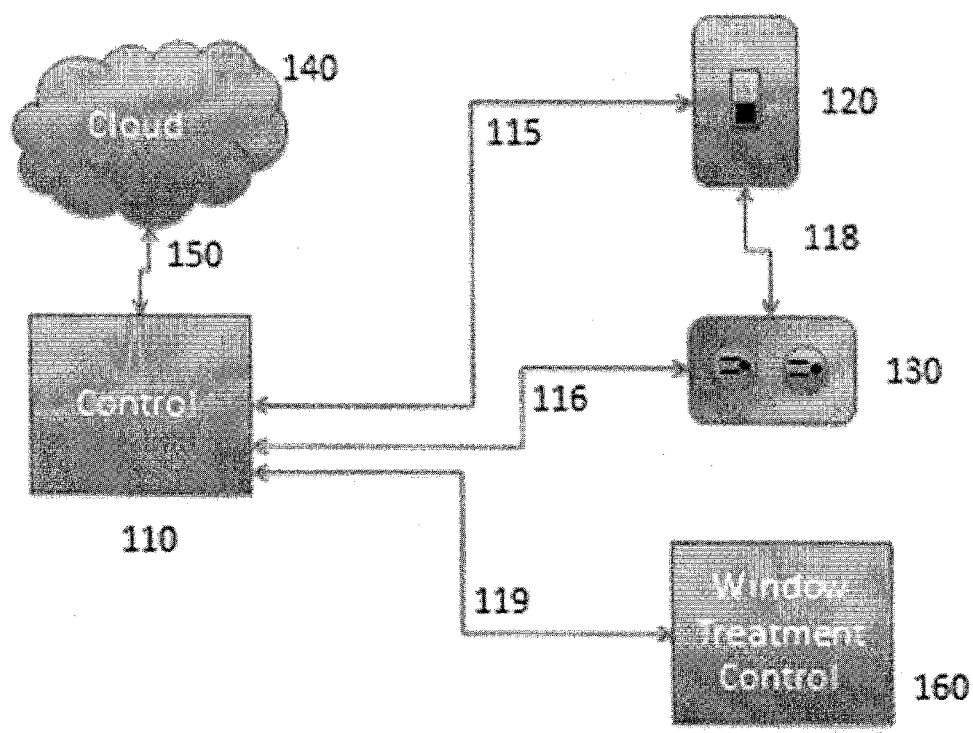
FIG. 1 schematically illustrates an exemplary automation system, in accordance with an embodiment of the present disclosure.

Reference now will be made in detail to embodiments of the present disclosure, examples of which are illustrated in the accompanying drawings. Wherever possible, the same reference numbers will be used throughout the drawings to refer to the same or like parts and/or components.

Overview

Embodiments of the present disclosure including, among other things, an automation system with a controller, remote switches, and remote outlets. The remote outlets may be configured to monitor power consumed by one or more electrical devices, such as, e.g., appliances, plugged into or otherwise coupled (e.g., wirelessly) to the outlets. In addition, the system may be configured to make a determination about the one or more electrical devices. The determination may include identifying a category or type of device for the one or more electrical devices. Based on the determination, the system may modify how power is supplied, if at all, to various electrical devices coupled to the system.

In another embodiment, the disclosed automation system may be configured to automatically determine whether a device requires a constant supply of electrical energy or whether energy supply may be temporarily terminated or otherwise reduced to lower energy costs. For example, the disclosed automation system may identify critical devices, such as, e.g., a clock radio, refrigerator, and/or medical devices, and ensure such devices receive continuous electrical energy. On the other hand, the automation system may identify non-critical devices, such as, e.g., a television and/or stereo, and terminate energy delivery after, e.g., an extended period of inactivity. Such functionality may also be associated with potentially dangerous home devices, such as, e.g., an iron. It is contemplated that the disclosed automation systems are capable of making such identifications without user intervention.

In a further embodiment, the automation system may be configured to determine the presence of a device, such as a fan, and based on the presence reduce the energy consumption of a second device, such as, e.g., an air conditioning, heating, or humidifying device. This modification would occur without any user intervention.

It some embodiments, the characteristic of a load or electrical device coupled to the home automation system may be determined by monitoring and analyzing the noise in power supply lines. One exemplary method of such monitoring and analyzing is discussed in U.S. Pat. No. 8,094,034 entitled "Detecting Actuation of Electrical Devices Using Electrical Noise Over a Power line".

According to a further embodiment of the present disclosure, the disclosed systems, apparatus, and methods may be used to monitor an entire structure, such as, e.g., a home, office, school, hospital, or sporting complex, to determine what loads are turned on or off and the user activity may be then inferred. In another embodiment, the disclosed systems, apparatus, and methods may be configured to monitor a plurality of independent structures to determine what loads are active, infer usage activity from the determination, and control usage in a manner to optimize efficiency and/or energy consumption.

By monitoring a device's power consumption characteristics at the outlet, various features or use parameters of the device may be determined. In other words, the outlet, and the automation systems disclosed herein, may be able to "learn" an identity or category of the device and/or usage characteristics. Based on the identified features/parameters/characteristics, the device can be beneficially and intelligently controlled. For example, an outlet supplying power to a television may disable power to reduce the power drawn by the television after a predetermined time and/or upon detection of an unoccupied viewing area. On the other hand, however, an outlet providing power to a clock radio would remain energized, regardless of time or occupancy in the immediate area. That is, if an outlet of the present disclosure determines that the load (i.e., the electrical device drawing power from the outlet) is a clock radio, the outlet may ignore commands to disable power, thereby allowing the clock radio to continue its normal function of waking an individual sleeping nearby.

In another example, if the load is determined to be an incandescent lamp, the outlet may allow dimming to provide ambiance or conserve energy. However, if the load is determined to be fluorescent, dimming would be restricted, since the ballasts typical of such lights malfunction at reduced voltages.

In a further example, a portable battery charger, such as, e.g., the charger of a laptop or cellular phone battery, may be coupled to an outlet according to the present disclosure. In this example, the outlet could monitor the outlet power transfer characteristics to identify that the load is a battery charger. The disclosed automation systems could then ensure the charger remains energized so as to allow complete charging of the battery. Once the battery is charged, the charger may switch to maintenance mode and would therefore reduce the amount of power it draws from the outlet. Once the charger's reduction in energy consumption is detected by the outlet, the automation system of the present disclosure may terminate energy to the outlet, thereby conserving the energy that would have been consumed by the charger when in maintenance mode.

Accordingly, the principles of the present disclosure serve to enhance a user's environment and reduce energy consumption through the use of an easy-to-setup automation system.

Exemplary Embodiments

The embodiments of the present disclosure can be further understood with references to FIGS. 1 through 8. FIG. 1 depicts an automation system 100. Automation system 100 may be used with any suitable structure, such as, e.g., a home, an apartment, an office, an office building, a hotel, a school, public transit structures, and/or a sporting complex. In addition, automation system 100 may be used in conjunction with a plurality of attached or discrete structures, in accordance with the principles disclosed herein. For example, one or more automation systems may be employed with a plurality of condominiums in an urban high-rise. In addition, or alternatively, one or more automation systems may be utilized within a community of suburban single-family homes. In embodiments where a plurality of individual home automation systems are used, each automation system may be in communication with other automation systems. Alternatively, each of a plurality of automation systems may be in communication with a central or master automation system. Further, although the present disclosure describes the use of automation system 100 with a "home," those of ordinary skill in the art will understand that such discussion is only for the purposes of describing the disclosed embodiments and its various features and capabilities.

With reference to FIG. 1, the automation system 100 may include at least one outlet 130, which can be remotely controlled. Outlet 130 may be disposed remotely of a control 110, which is discussed below in greater detail. Outlet 130 may be configured to monitor the power consumed by attached electrical devices and to control the power delivered by the outlet 130. In one embodiment, for example, automation system 100 may be configured to terminate power delivery through outlet 130. In another embodiment, automation system 100 may be configured to control (e.g., interrupt, change, adjust, terminate and/or meter) the power delivered through outlet 130.

Outlet 130 may include one or more sensors disposed therein or operably coupled to (e.g., integrated with, connected to, or built within the structure of) outlet 130. In other words, in some embodiments, the disclosed one or more sensors may be disposed within a housing of outlet 130. The sensors may be configured to sense, among other things, temperature, motion, air quality, pollutants, contaminants, light, sound, humidity, liquid, air flow, and/or certain signals, such as, e.g., radio frequencies (RF) or infrared. In addition, as explained below, outlet 130 may be coupled to an electrical power source. For example, outlet 130 may be coupled to an electrical power grid delivering electrical current at 110V or 220V. In other embodiments, outlet 130 may be connected to an auxiliary power source, such as, e.g., a back-up generator and/or a solar panel.

Automation system 100 may also include a switch 120 which can provide a control signal to control 110. Although the depicted embodiment illustrates switch 120 being disposed remotely from outlet 130, switch 120 may be integrated with or built within the structure of outlet 130. For example, in one embodiment, outlet 130 may be disposed within a housing of switch 120. Switch 120 may be configured to break a circuit supplying power to outlet 130, thereby interrupting power supply to outlet 130. Further, switch 120 may be configured to control (e.g., interrupt, change, adjust, and/or meter) the supply of power to outlet 130. Switch 120 may control or terminate power supply to outlet 130 based on a number of inputs. For example, switch 120 may terminate power supply to outlet 130 upon receiving a command from, e.g., control 110. In addition, switch 120 may terminate power supply to outlet 130 in response to a sensed condition. For example, upon sensing moisture or gas in the vicinity of outlet 130, switch 120 may interrupt power supply to outlet 130. Like outlet 130, switch 120 may also include one or more sensors for sensing, among other things, temperature, motion, air quality, pollutants, contaminants, light, sound, humidity, liquid, air flow, and/or certain signals, such as, e.g., radio frequencies (RF) or infrared. The inputs from such sensors may also cause switch 120 to temporarily interrupt, change, adjust, and/or meter the supply of power to outlet 130.

Control 110 may be any suitable computing device including a microprocessor, memory, a user interface, and/or a portable power supply, such as, e.g., a battery. Control 110 may be a discrete control unit (e.g., a laptop, desktop, tablet, or the like) for automation system 100. In some embodiments, control 110 may be integral with one of switch 120 or outlet 130. In other embodiments, control 110 may be operably coupled to one or both of switch 120 and outlet 130 via any suitable means known in the art, as discussed in greater detail below. In embodiments where a plurality of automation systems 100 are used, each automation system may be in communication with a common control 110. In other embodiments, each of a plurality of automation systems may include an individual control 110. In such embodiments, each individual control 110 may be in communication with one another via, e.g., the internet cloud 140. Further, control 110 may be voice activated.

Control 110 may be connected via wired or wireless network connection 150 to the internet cloud 140. The internet cloud 140 may include one or more databases in communication with control 110. Control 110 may be also connected to the switch 120 via wireless connection 115. In some embodiments, the connection between control 110 and switch 120 may be wired. Alternatively, the connection 115 may be over any suitable medium, including, but not limited to, infrared or fiber optic. Similarly, control 110 may be connected to the outlet 130 via any suitable wired or wireless connection 116. Still further, switch 120 may be operably coupled to the outlet 130 via any suitable wired or wireless connection 118.

In some embodiments, control 110 may reside in the Internet cloud, and the functions of control 110 (or any of the microprocessors disclosed herein) maybe executed on any suitable server located in the Internet cloud or storing data/algorithms relating to control 110. If control 110 is located in the Internet cloud, connections 115, 116, and 119 may include connections to the internet cloud to the control 110. For example, outputs from sensors 240/340 may be communicated to the Internet cloud.

Automation system 100 may also include other home automation enhancements. In one embodiment, system 100 may include a remote controller 160 for, among other things, controlling a positioning of window coverings. Controller 160 may be also configured to control other systems associated with a home, office, school, or other structure. For example, controller 160 may control systems for irrigation, heating and cooling, entertainment, and/or water heating. In addition, controller 160 may control one or more safety systems.

In the embodiment where controller 160 may control window treatments, the controller 160 may receive instructions from the control 110 via any suitable wired or wireless connection 119. The connections 116, 115, and 118, and 119 may be over the same or different protocols or standards. In addition to instructions being processed by control 110, it is expected that some or all of the processing could be performed by the microprocessor(s) in the switch 120, outlet 130, and/or controller 160, as described below.

Further, the automation system 100 may be built in a single or multi-family dwelling, condo unit, apartment, office, or office building, as alluded to above. It is also expected that automation system 100 may include multiple switches 120, outlets 130, and controllers 160. Other devices, such as, e.g., moisture sensors, may be operatively coupled to automation system 100 to provide information on the presence of water or rain. Still further, the automation system 100 may be operatively coupled to devices for sensing, among other things, light, sounds, temperature, humidity, air quality, pollutants, contaminants, water quality, air flow, motion and/or certain signals, such as, e.g., radio frequencies (RF) or infrared.

Figure 2:
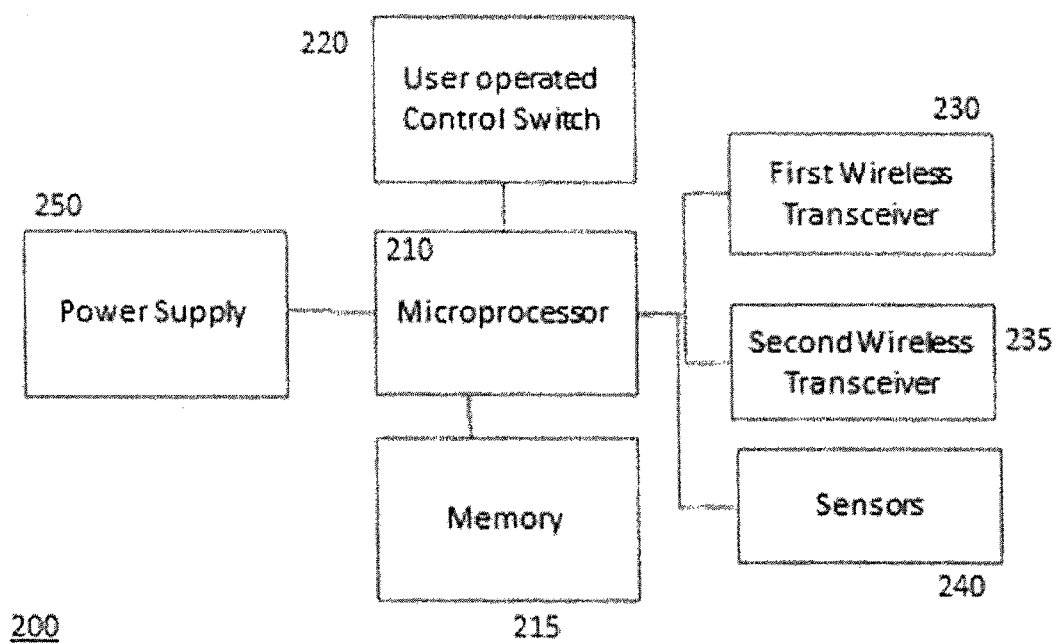
FIG. 2 illustrates a block diagram of an exemplary switch that can provide control signals within the automation system of FIG. 1.

FIG. 2 is a block diagram for a switch 200 that may be used in conjunction with automation system 100 and may operate as switch 120 in FIG. 1. The switch 200 may include a microprocessor 210 capable of running a software or algorithm stored in a memory 215. Memory 215 may be any suitable solid state or flash memory. The switch 200 may include a user-operated control switch 220, which may be a mechanical switch, or any of various user input devices such as a touch sensor or push buttons. In some embodiments, user-operated control switch 220 may be voice activated. User-operated control switch 220 may be configured to control (e.g., interrupt, adjust, change, terminate and/or meter) the supply of electrical energy to a device or electrical outlet (e.g., outlet 130) in communication with switch 200. Accordingly, in one embodiment, user-operated control switch 220 may be configured to transition between an "on" position and an "off" position. In addition, or alternatively, user-operated control switch 220 may include a variable resistor which may allow a user to discretely or continuously control the flow of electrical energy through switch 200.

Switch 200 may further include a first wireless transceiver 230, an example of which is shown as an 802.11 Wi-Fi transceiver in FIG. 2. The use of the word "transceiver" herein should not be construed as limited to any particular structural components. Instead, "transceiver," as used herein, may include any structural components configured to allow for back and forth communication. Accordingly, the "transceivers" disclosed herein may include, but are not limited to, antennae, communication ports, and any other elements needed to achieve the desired function. As those of ordinary skill in the art will recognize, however, the first wireless transceiver 230 may be configured to communicate over any known wireless standard, including, but not limited to, X10, ZigBee®, and/or Bluetooth. Further, although the exemplary embodiment depicts transceiver 230 as a wireless transceiver, those of ordinary skill will readily recognize that first wireless transceiver 230 may be replaced with a wired communication mode. First wireless transceiver 230 may allow switch 200 to communicate with a control device, such as, e.g., control 110 depicted in FIG. 1. That is, the first wireless transceiver 230 may allow switch 200 to exchange commands with control 110.

In some embodiments, switch 200 may also include a second wireless transceiver 235 for allowing switch 200 to communicate with one or more devices (e.g., outlet 130 or any electrical load coupled to outlet 130) being controlled by switch 200. As those of ordinary skill in the art will recognize, first and second wireless transceivers 230, 235 may allow for communication over one or more communication protocols. In addition, first wireless transceiver 230 may be configured to communicate over a protocol that is different from the communication protocol of second wireless transceiver 235. Moreover, in some embodiments, switch 200 may only include a single transceiver for communication with both control 110 and multiple controlled devices. In such embodiments, the single transceiver may be also replaced by a suitable single wired communication mode. Even further, switch 200 may include a transceiver for each device it controls. Furthermore, second wireless transceiver 235 may be configured to send/receive messages to/from a user's portable communication device and/or local emergency authorities. For example, in the event of a system malfunction, system 100 may notify a user by sending, e.g., a text message to a user's cell phone or e-mail account. In addition, if one or more sensors detect, e.g., the presence of gas or temperatures associated with fire, the system 100 may automatically alert local emergency officials.

The switch 200 may also include sensors 240 suitable for sensing, among other things, light, motion, sound, temperature, humidity, air quality, pollutants, contaminants, water quality, air flow, and/or certain signals, such as, e.g., radio frequencies (RF) or infrared. The switch 200 may also include a power supply 250. Power supply 250 may be any suitable power supply known in the art. For example, power supply 250 may include a battery (e.g., a rechargeable battery). In other embodiments, power supply 250 may schematically illustrate a wired or wireless connection to a power network, such as, e.g., a power grid or transformer. Further, those of ordinary skill in the art will understand that power supply 250 may include both a battery and a connection to a power network.

The microprocessor 210 may be any suitable microprocessor known in the art. In addition, although FIG. 2 depicts microprocessor 210 as being within switch 200, microprocessor 210 may be disposed remotely of switch 200. Microprocessor 210 may be operable to communicate with (e.g., receive inputs from and send commands to), among other things, the sensors 240, first wireless transceiver 230, second wireless transceiver 235, and user-operated control switch 220, as discussed in greater detail below. Switch 200 may be a single component configured to be installed with pre-existing wiring.

Figure 3:
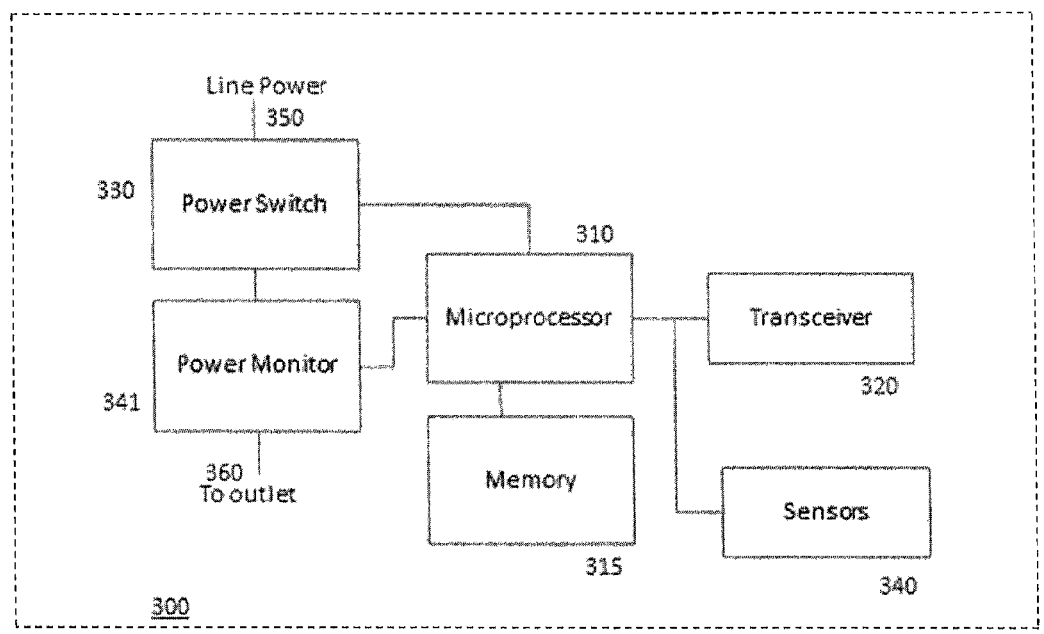
FIG. 3 illustrates a block diagram of an exemplary outlet for use with the automation system of FIG. 1.

FIG. 3 is a block diagram of an outlet 300 that may operate as outlet 130 depicted in conjunction with automation system 100 shown in FIG. 1. Outlet 300 may be a remotely controlled outlet, in accordance with the principles of the present disclosure. In some embodiments, however, outlet 300 may be disposed integrally with switch 200 or control 110. Outlet 300 may include a microprocessor 310 that runs software or an algorithm stored in a memory 315. Microprocessor 310 and memory 315 may include one or more of the features described in connection with microprocessor 210 and memory 215. Further, in some embodiments, outlet 300 may be voice activated.

Outlet 300 may also include a transceiver 320. Transceiver 320 may include any of the features described in connection with transceivers 230 and 235. In one embodiment, for example, transceiver 320 may be a wireless transceiver. Transceiver 320 may be configured to connect outlet 300 to a control device such as, e.g., switch 120 depicted in FIG. 1. More generally, transceiver 320 may allow outlet 300 to receive commands from one or more sources, including, but not limited to, remote sensors or control 110. Transceiver 320 may facilitate communication over any suitable wired or wireless protocol, including, but not limited to, 802.11 Wi-Fi, ZigBee®, X10 standard, or any other wireless protocol known in the art.

Outlet 300 may be configured to receive electrical energy (e.g., line power) from a power distribution network via any suitable connection 350. Electrical power received at connection 350 may first pass to a power switch 330, which may be controlled by microprocessor 310. Power switch 330 may be also manually controlled by a user. Further, power switch 330 may be remotely controlled by a user via, e.g., web-enabled application and/or a mobile platform. The power switch 330 is operable to connect or disconnect the line power to/from the outlet 300 and any connected load 360 (e.g., any electrical device coupled to outlet 300). In some embodiments, power switch 330 may be configured to control (e.g., interrupt, change, adjust, terminate and/or meter) the quantity of electrical energy delivered to outlet 330. For example, power switch 330 may be operable to reduce a voltage delivered to the load 360, thereby providing a dimming function.

Outlet 300 may also include a power monitor 341. Power monitor 341 may be any suitable monitor known in the art. In addition, although the depicted embodiment illustrates power monitor 341 as being disposed within outlet 300, power monitor 341 may be disposed remotely of outlet 300. Power monitor 341 may be configured to measure the consumption of power by load 360. The measured power data may be sent to microprocessor 310. In some embodiments, microprocessor 310 may be coupled to power monitor 341 by any suitable connection. The power monitor 341 may also measure noise in the connection to load 360. Connection 360 can be any connection known in the art for providing power to electrical devices. Such connections may include standard 2 or 3 pin power outlets, 110V/220V outlets, international standard outlets, and may also include wireless transfer of power by, e.g., means of induction. The connection may also allow direct wired connection to a load such, for example, a ceiling fan, a flood lamp, light fixtures, or other devices which maybe directly connected to the power grid in a building.

Outlet 300 may be also operably coupled to one or more sensors 340. Sensors 340 may be configured to sense, among other things, light, motion, sound, temperature, humidity, air quality, pollutants, contaminants, water quality, air flow, and/ or certain signals, such as, e.g., radio frequencies (RF) or infrared. Although the depicted embodiment illustrates sensors 340 as being part of outlet 300, sensors 340 may be disposed remotely of outlet 300. Further, microprocessor 310 may be configured to receive one or more inputs from sensors 340. Upon detection of a predetermined parameter, for example, microprocessor 310 may be configured to instruct power switch 330 to interrupt the flow of power from line connection 350 to load 360. Further, the sensors 340 may be configured to communicate an output corresponding to a sensed condition to the Internet.

As alluded to above, one or both of switch 200 and outlet 300 may include sensors for detecting an infrared or RF signal. In one embodiment, it is contemplated that automation system 100 may terminate power delivery to an outlet 300 if outlet 300 or an associated switch detects a nearby RF or infrared source. Particularly, it is contemplated that an infrared or RF generating device may be worn by, e.g., a toddler or a pet. If the toddler or pet approaches to within, e.g., 1-3 feet of a particular outlet 300, the outlet 300 and/or switch 200 may detect the infrared/RF source, and automation system 100 may temporarily terminate power delivery to that outlet 300. Doing so, may prevent accidental electrocutions should the toddler or pet insert a metal object (e.g., a fork) into the outlet 300.

Like switch 200, outlet 300 may be a standalone device configured to be installed in, e.g., a home, and work seamlessly with pre-existing wiring. In some embodiments, outlet 300 may be an adaptor configured to be plugged into pre-existing electrical outlets. In such embodiments, the adapter may include a plurality of electrical pins for coupling with an existing electrical outlet. The adaptor may also include a plurality of ports to receive the electrical pins of an electrical device. The adaptor may have all of the components and features of outlet 300 discussed above. In one embodiment, the adaptor may be configured to plug into existing electrical outlets. In this embodiment, for example, the line power 350 is provided to the adaptor from the existing electrical outlet. The adaptor may also have the form of an extension cable, where the adaptor includes at one end of a power cord having a plug configured for connection to an existing electrical outlet, and may include a receptacle at a second end to accept a plug from an electrical device, where the components of outlet 300 may be included in the cable, or one of the ends of the cable. It is also envisioned that the adaptor may be in the form of a power strip that includes one or more electric receptacles, with a power cord to attach to an existing receptacle. The adaptor advantageously enables building automation to be added to existing structures without re-wiring existing electrical service.

With renewed reference to FIG. 2, for example, switch 200 may be configured to be in communication with outlet 300. For example, in one embodiment, switch 200 may be configured to manually override power delivery to outlet 300. For example, if control 110 terminates power delivery to outlet 300, a user may re-enable power delivery to outlet 300 by toggling switch 200. As also explained above, switch 200 may also be in communication with control 110. Thus, control 110 may be able to control the power delivery to outlet 300 by controlling switch 200. Switch 200 may be also configured to automatically terminate power delivery to outlet 300 based on, e.g., the input from one or more sensors 240.

Figure 4:
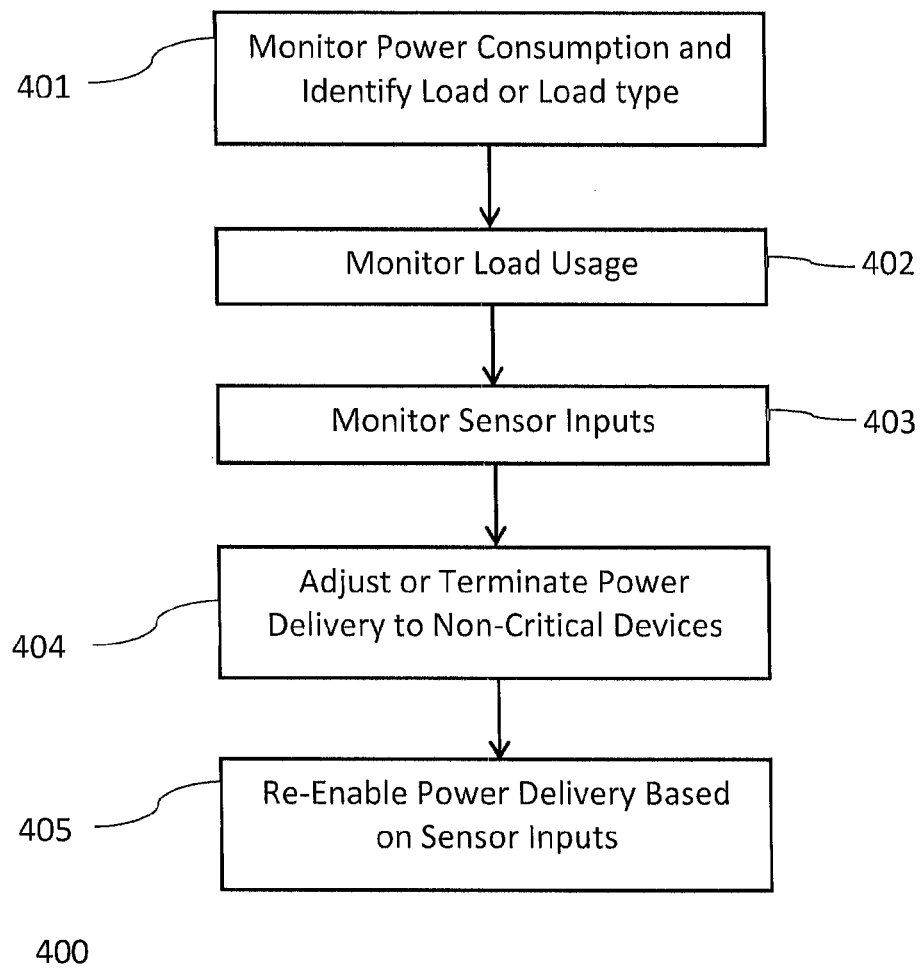
FIG. 4 depicts a flowchart of an exemplary method for operating an enhanced automation system, in accordance with an embodiment of the present disclosure.

Turning now to FIG. 4, there is depicted a flow chart 400 of an exemplary mode of operation for an automation system 100, in accordance with the present disclosure. For discussion purposes, it is understood that the exemplary method may be employed in connection with an automation system having multiple switches 120/200 and outlets 130/300.

At step 401, for example, power monitor 341 of outlet 300 may monitor the power consumed by the various loads 360 plugged into a plurality of outlets 300. The power monitor 341 may also analyze the noise generated by each of the loads to identify each load and/or group/characterize loads by category. The monitored data may be communicated to microprocessor 310. The automation system 100 may also monitor the usage of one or more loads, step 402. More particularly, in addition to monitoring the power consumption of a load, automation system 100 may monitor the use characteristics of one or more loads 360. For example, automation system 100 may track and store historical data of, e.g., when certain loads are typically used, the duration of each use, and the like. For example, automation system 100 may identify that a particular load connected to one outlet 300 is a washing machine. Automation system 100 may also monitor and store the usage trends of the washing machine, which may be, e.g., 2 hours once a week on Sunday. Further, at step 403, e.g., automation system 100 may monitor various conditions nearby one or more outlets 300 by monitoring the inputs of one or more sensors 340.

The monitored data may be captured and sent to the microprocessor 310. The data may be analyzed by microprocessor 310, or sent via transceiver 320 to switch 200 and processed in microprocessor 210 or sent to another computing device connected to switch 200 or outlet 300. As alluded to above, the data may be analyzed to determine the nature of the load. For example, the characteristics of the load, such as, e.g., power consumption and/or noise generated in the power lines, may be compared to a database(s) of known loads or load categories. Based on the comparison, the load connected to outlet 300 may be identified and/or categorized. The database may be a compilation of previously identified load characteristics. In addition, the database may be updated continuously by any known methods. For example, the principles of crowdsourcing may be employed to ensure the database(s) is kept up-to-date. More particularly, the database may be configured to receive and store monitored characteristics from a plurality of automation systems. In this manner, the database may be continuously updated as new electrical devices enter into the market and are put to use.

As the monitored data is analyzed and various loads are identified, a determination is made if the device can tolerate dimming or reduced voltage. For example, automation system 100 may adjust or terminate power delivery to non-critical devices, step 404. More particularly, if automation system 100 identifies a load as a non-critical load, automation system 100 may terminate power delivery. For critical devices, however, power delivery may continue uninterrupted. Examples of critical devices include, but are not limited to, refrigerators, clock radios, ventilators, life-support machines, electronic safes, heating/cooling systems. On the other hand, certain identified loads may be suited for reduced voltage. For example, incandescent lights may tolerate or benefit from a reduction in voltage (e.g., dimming). Thus, if automation system 100 identifies a particular load suited for dimming, the automation system 100 may reduce the voltage provided to that load after, e.g., a predetermined lapse of time or a lack of motion in the vicinity of the load. For incandescent light bulbs, for example, a light sensor may detect an increase in ambient light (e.g., sunrise), and automation systems 100 may consequently reduce the voltage to the bulb, thereby saving power. If a detected load is unable to tolerate a reduction in voltage, automation system 100 may continue power delivery. Alternatively, automation system 100 may terminate power delivery after, e.g., a predetermined time lapse.

In one embodiment, e.g., automation system 100 may ensure critical devices continue to receive the power needed for them to function in the event of a power failure. For example, an embodiment of automation system 100 may include a back-up generator. In such an embodiment, automation system 100 may automatically route power generated by the back-up generator to those outlets 300 supporting critical devices.

As noted above, automation system 100 may be configured to monitor one or more sensors, e.g., sensors 240/340. Thus, if a sensor 240/340, e.g., a motion sensor, senses that a person enters a room in the vicinity of a particular load, or by a load change indicative of user intervention (for example, an increase in power consumption by a refrigerator attributed to the courtesy light may be an indication that someone is in the kitchen), the automation system 100 may re-enable power delivery to one or more outlets 300, step 405. In another example, a doorway to a room (e.g., a kitchen) may have a threshold motion sensor. Thus, when a user crosses the doorway, the automation system 100 may re-enable power delivery to all outlets 300 in the room. In this manner, outlets 300 and loads 360 that were disabled to conserve power in the absence of activity may be reactivated when a user is present or nearby. This step allows a person to turn on, e.g., the coffee maker in a kitchen or a hair dryer in the bathroom without taking additional steps to enable the outlet to which these devices may be connected. This simplification will greatly improve the usability of automation system 100 and insure that users take advantage of the ability of automation system 100 to conserve resources and reduce energy costs. Further, embodiments of the present disclosure provide for remote operation of automation system 100, switch 120, and/or outlets 130. For example, power delivery to a particular outlet 130 may be terminated remotely by a user via, e.g., a web-enabled application or a mobile platform to selectively conserve power. Similarly, automation system 100 may allow a user to selectively re-enable power delivery remotely. For example, the user may be able to turn on one or more lights when a home is unoccupied.

Continuing with the exemplary method of FIG. 4, automation system 100 may be configured to determine that a room is empty based on a lack of activity detected by a sensor 240/340 (e.g., a motion sensor) or by identifying a reduction in the power usage of electrical devices in the room. Once it is determined that a room is empty, automation system 100 may wait for certain devices to complete operations currently in progress (e.g., washing machine finishes cycle, dishwasher finishes cycle, etc.) or wait a pre-determined time delay such as, e.g., three (3) minutes, prior to terminating power delivery to outlets 300 in the room. It should be noted that the pre-determined time delay may be adjustable by a user and/or automatically by automation systems 100 based on, e.g., monitored usage characteristics. Once again, automation system 100 may determine whether to delay termination of power based on the identity of a load or category of loads. Furthermore, it is worth noting that some devices, such as a microwave, upon finishing a cycle may indicate that a person will likely be present and shutting off outlets may be delayed (e.g., if a person makes popcorn in the microwave, they will likely come back to the kitchen to retrieve it after it has finished popping). Thus, the delay in terminating power delivery may be based on an identification of one or more loads and whether the load is of the type that typically requires a user to return after an operating cycle.

As noted above, once automation system 100 determines the types of loads coupled to outlets 300, automation system 100 may be able to identify those devices which require continuous power delivery and refrain from terminating power to those loads. Loads that may be exempt from having their outlets disabled may include, but are not limited to, clocks, refrigerators, heating/cooling systems, security and safety systems (e.g., smoke detectors), ventilators, healthcare devices, and/or computing networks.

The steps of method 400 may be executed on microprocessor 210, microprocessor 310, another microprocessor connected to the outlet 300 or connected to the switch 200, or by a combination of these microprocessors.

One benefit of method 400 is to enable enhanced services such as dimming when the device plugged into the outlet is capable of supporting dimming, without additional user intervention. For example, if a vacuum cleaner is plugged into outlet 300 controlled by switch 200, the switch 200 will function as an on/off switch, preventing possible damage to the appliance caused by providing inadequate power. If, however, a lamp is plugged into outlet 300 controlled by switch 200, the switch 200 may dim the lamp (provided the lamp supports dimming) without additional user input.

Control 110 may allow the user or a system administrator to set a control to determine how aggressively devices may be controlled or disabled. By making a selection, the user may cause the control 110 not to disable devices at all, to select which devices will be disabled, and/or to determine how long to wait before disabling devices. In one example, a coffee maker may include a timer to automatically start brewing. A user may utilize the timer function to automatically begin brewing coffee at, e.g., 6 AM in the mornings. Thus, the user may want the outlet to which the coffee maker is plugged into to stay energized to allow coffee to be prepared as per the timer. Thus, the automation system 100 of the present disclosure may allow cost conscience users to selectively designate those devices which may receive continuous power delivery (even if the device is a non-critical load) while terminating power delivery to other devices. In addition, the automation system 100 may allow a user to designate the time delay before certain devices are enabled.

Figure 5:
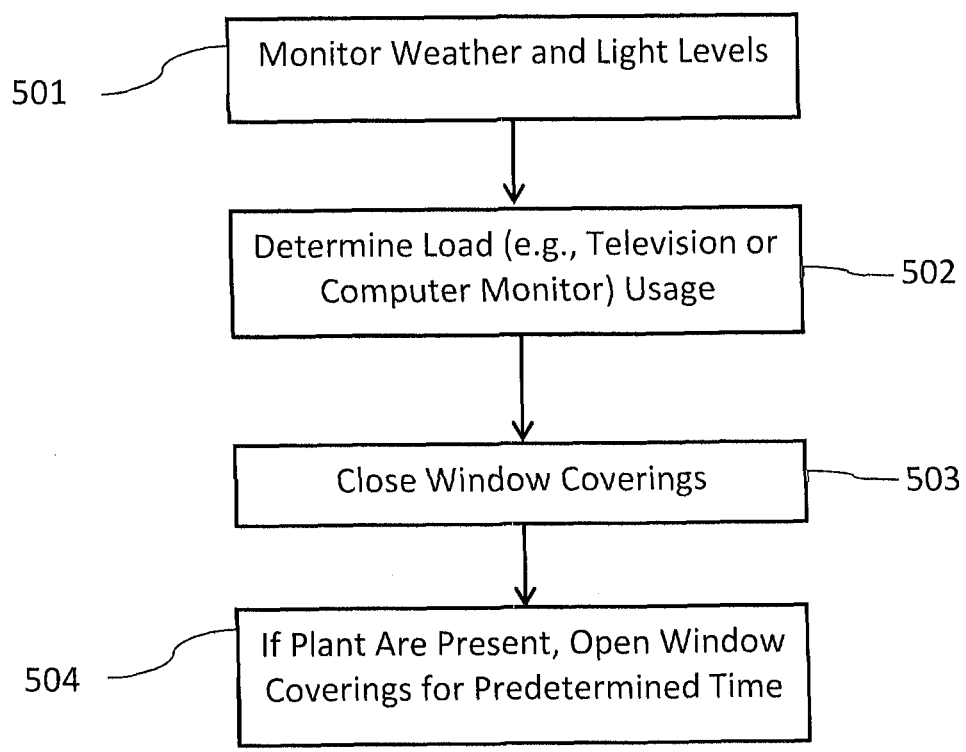
FIG. 5 depicts a flowchart of an exemplary method for controlling lighting with an embodiment of an automation system disclosed herein, in accordance with the present disclosure.

Turning now to FIG. 5, there is depicted an exemplary method 500 for controlling a level of light in a room. At step 501, e.g., automation system 100 may collect weather information. Such information may be collected by sensors, such as, e.g., sensors 240/340 operably coupled to switches 200 or outlet 300, from information obtained from the internet, or from any other sensors connected to the automation system 100.

If, based on the principles of load identification disclosed herein, automation system 100 identifies a television or other monitor operating within a certain area (step 502), the automation system 100 may control one or more window coverings to control a level of light in the room (step 503). More particularly, if it is determined that a television or other display is operating, and the sun is shining, and the sunlight is shining on or in the vicinity of the television, then the control 110 would order the controller 160 to close the window coverings to a position such that the sunlight is blocked from directly shining on the appliance. The determinations of sunlight levels and direction may be made by one or more light sensors operably coupled to automation system 100 and/or the television/monitor.

Similarly, if automation system 100 determines that a room is empty, control 110 may command controller 160 to close window coverings to, among other things, reduce the load on a heating and air conditioning system, thereby conserving energy and reducing costs. The room may be determined to be empty from sensor (e.g., motion sensor) data. In addition, a room may be identified as empty from power consumption data collected from, e.g., outlets in the room. For example, if power consumption at a majority of outlets in the room is at a minimum (e.g., TV is off, lights are off, etc.), automation system 100 may understand that there are no users in the room.

In some embodiments, a user may choose to place, e.g., plants or pets in a room. In an embodiment where the user places plants in a room, e.g., the presence of plants may be programmed into automation system 100, or may be discovered from sensors 240, which may include cameras, $CO_2$ sensors, $O_2$ sensors, and humidity sensors. In addition, once a user informs automation system 100 of plants, or plants are detected, in a particular area, automation system 100 may query the user to input the plant type and/or required levels of light. In addition, automation system 100 may research databases (e.g., internet plant databases) to retrieve lighting requirements for particular plants. Based on the required lighting levels for the identified plants, control 110 may open and close window coverings via controller 160, step 504. For example, the window coverings may be operated to stay open during a portion of morning and evening hours so as to provide appropriate light for the health of the plant.

In another embodiment, automation system 100 may be configured to control various systems within a home based on, e.g., energy action days. Energy action days are typically days designated by authorized local utilities or governments to promote conservation of energy. In particular, on energy action days, citizens may be encouraged to conserve energy due to high peak demands or high costs of fuel.

During designated energy action days, automation system 100 may receive an indication of the energy action day from the internet 140 over a network connection 150. In addition, a user may selectively place automation system 100 in an energy action mode. Upon receiving indication of an energy action, control 110 may order controller 160 to close window coverings partially or fully to reduce the heating load on a heating and/or cooling system, thereby reducing the energy consumption. In the above example of plants, e.g., a response to an energy action day may override preexisting programs/instructions, such as, e.g., an instruction to open window coverings at 2 pm each day to provide light for plants.

An indication of an energy action day may also cause control 110 to restrict other actions. For example, appliances such as dishwashers, clothes washers, and clothes dryers may be restricted to operate in hours designated as off peak, such as, e.g., between 6 pm and 6 am. In another example, an outlet 300 controlling a pool pump may be energized only at night, thereby restricting operation of the pool pump to off-peak or night hours. In a further example, control 110 may be connected to a thermostat controlling air conditioning and heating systems, which may be adjusted to reduce energy consumption during energy action days. Control 110 may be also connected to a hot water heater or boiler, which may be controlled to reduce the temperature or frequency of operation during energy action days. Further, control 110 may be connected to television or monitors and may reduce the brightness of the display to save energy or disable some of these devices in response to the control 110 receiving an indication of an energy action day.

In another embodiment, control 110 may monitor costs of energy, which may increase or decrease at different times of the day or during different periods of the year, as well as monitor for energy action alerts. By monitoring the pattern of energy drawn by a particular electrical device, e.g., control 110 may be able to identify particular operations or cycles. For example, a dishwasher may consume power at a first rate during the wash cycle, which involves running the pump and agitator, and consume power at a second rate when the heated dry cycle is active. Based on this information, control 110 may shut off an appliance after a particular cycle is complete in response to a change in energy cost, an energy action alert, or another input. The device may be then re-activated by control 110 to finish operation after the energy action alert expires or after the time of day advances till the energy cost is lower. Such control may optimize electrical device operation to minimize utility cost to the user and to minimize energy usage during, e.g., an energy action alert or during peak usage hours, without, e.g., stopping an appliance in the middle of a cycle. Allowing a cycle to finish resolves the sub-optimization of, e.g., stopping a dishwasher partially through a wash cycle, which may result in the entire wash cycle needing to be repeated, which would ultimately increasing energy usage.

In another exemplary embodiment, an irrigation system (not shown) may be coupled to an outlet 300 of the present disclosure. Automation system 100 may be configured to receive weather data as explained herein. Based on such data, and based on user input, automation system 100 may be configured to terminate power delivery to the irrigation system during and immediately after periods of heavy rainfall. Similarly, power to the irrigation system may be enabled during periods of drought or irregularly high temperatures. Furthermore, automation system 100 may be used to ensure compliance with a predetermined utility budget. For example, a user may program automation system 100 to only permit the irrigation system to irrigate up to a predetermined utility cost (e.g., $200.00 per month). In addition, the user may program automation system 100 with the cost of certain utilities (e.g., water and electricity). Thus, once the irrigation system has delivered water matching the cost of the predetermined budget, automation system 100 may terminate delivery of power to the irrigation system.

In another exemplary embodiment, automation system 100 may be used to control a plurality of valves within a home or other suitable structure. For example, a home may be provided with electrical valves for controlling the supply of water to, e.g., a washing machine, a dish washer, and a shower. Based on sensed usage (e.g., power consumption) or historical data, automation system 100 may automatically open and close certain valves to maintain optimal water pressure. For example, if automation system 100 detects that both a washing machine and dishwasher are simultaneously running, automation system 100 may close the valve to the washing machine until the dishwasher has completed its wash cycle. Alternatively, if automation system 100 detects a user in a shower (via, e.g., a motion sensor), automation system 100 may close the valves to the dishwasher and washing machine, to ensure the user receives optimal water pressure in the shower. The principles of maintaining water pressure, as well as the other principles disclosed herein, may be applied to multiple automation systems 100 controlling a plurality of discrete structures.

In an even further example, automation system 100 may selectively activate and deactivate a home hot water heater. For example, during summer months, automation system 100 may limit the energy delivered to a hot water heater, or limit the periods during which energy is delivered to the hot water heater. In the winter months, however, automation system 100 may increase the energy delivered to the hot water heater and/or increase the periods of time within which energy is delivered to the hot water heater.

FIGS. 6a and 6b further describe exemplary methods 600 and 650 of managing light levels in an occupied room e.g., during dawn or dusk. In method 600 depicted in FIG. 6a, automation system 100 may detect, via an increase in power consumption or an increase in light levels, when a user turns on lights prior to sunrise, step 601. Automation system 100 may know the timings of sunrise based on data retrieved from the Internet and/or inputs from light sensors placed outside of, e.g., the home or other structure. Once it is detected that a user has turned certain lights on prior to sunrise, automation system 100 may make a record of the ambient light within the room via, e.g., a light sensor. As the sun rises, the light sensor may detect an increase in ambient light levels. The detected ambient light levels may be periodically compared to the earlier recorded level of light. Once automation system 100 concludes that the current ambient light level matches or exceeds the earlier recorded level of light, automation system 100 may begin to dim or turn off the lights turned on by the user. As alluded to above, the lights may be dimmed or turned off by adjusting or terminating the energy delivered to the lights, step 603. This exemplary method may reduce power consumption by automatically disabling lights that are not needed as the sun rises.

Turning now to FIG. 6b, there is depicted an exemplary method 650 for controlling lights during sunset. In one example, automation system 100 may detect the presence of a user in a particular room prior to sunset. The automation system 100 may detect the presence of the user via inputs from, e.g., motion sensors. Automation system 100 may identify the user's presence as being prior to sunset based on sunset times retrieved from the Internet. In addition, the automation system 100 may receive external light level data from one or more exterior light sensors operably coupled to automation system 100. Once automation system 100 detects the presence of a user in a room prior to sunset, the automation system 100 may record and store the ambient light levels in the room, step 651. As the sun sets (step 652), automation system 100 may gradually enable the lights in a room to maintain the earlier-record ambient light level (step 653). In some embodiments, the energy to the lights may be simply turned on. In other embodiments, the lights may be turned on, and the voltage increased gradually, in accordance with the decrease of light provided by the sun.

Figure 7:
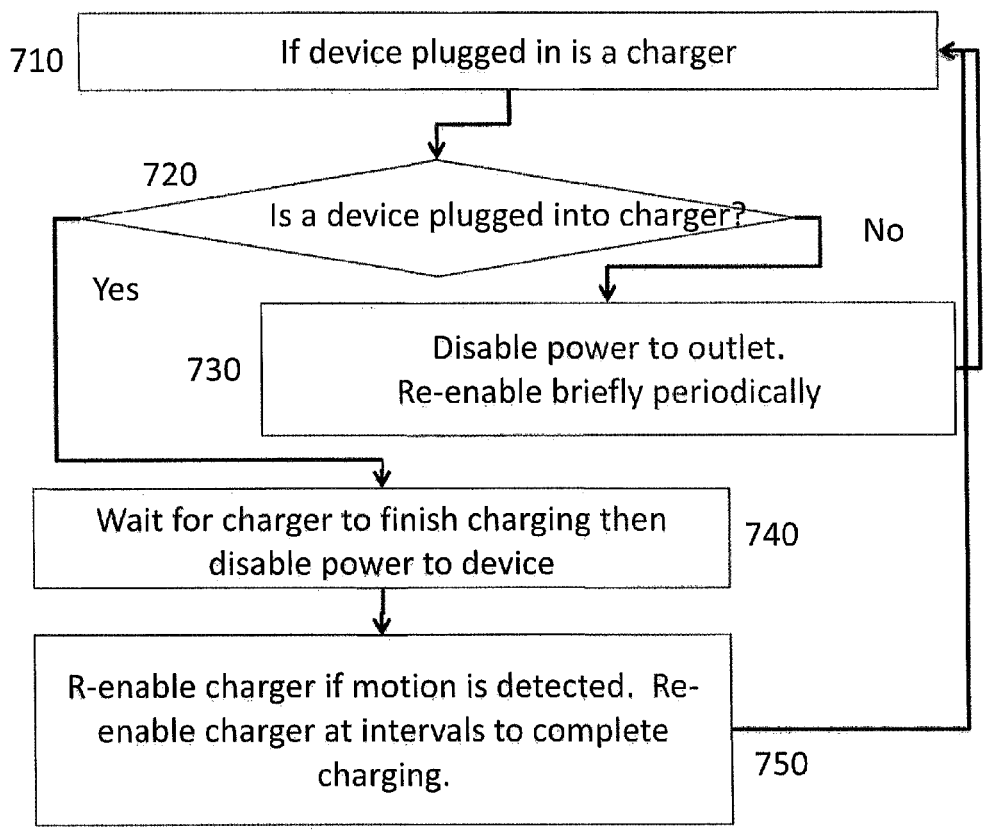
FIG. 7 depicts a flowchart of an exemplary method for conserving energy with an embodiment of an automation system disclosed herein.

With reference now to FIG. 7, there is depicted an exemplary method 700 for controlling power delivery to a portable battery charger. In accordance with the principles of the present disclosure, method 700 may provide for conserving energy while ensuring the charger operates fully to completely charge a connected battery.

At step 710, e.g., automation system 100 may monitor power consumption and noise in the associated power lines to determine if a portable battery charger is connected to any outlet 300. Once identified, automation system 100 may subsequently monitor the power consumption characteristics to determine if the charger is currently charging a battery, step 720. If a device is not being charged, the outlet may be temporarily disabled to reduce power consumption typical of chargers not in use (e.g., vampire or phantom loads), step 730. In one embodiment, the outlet may be re-enabled periodically, e.g., every 15 minutes or other suitable time integral, to determine if a device to be charged has been attached to the charger. The outlet may optionally be enabled if motion is detected (via, e.g., a motion sensor) indicating a person is in the vicinity of the charge.

If, however, automation system 100 detects that a device is being charged at step 720, automation system 100 may monitor the power consumption of the charger until it determines that a charging cycle is complete. At this time, automation system 100 may terminate the power delivered to the charger, step 740.

In one embodiment, automation system 100 may be configured to periodically "top-off" a portable battery without leaving the charger energized full time. For example, the charger may be re-enabled if motion is detected in the room (via, e.g., a motion sensor). Such motion may indicate a user awaking in the morning. In this manner, the charged device may be "topped-off" prior to the user retrieving the device from the charger. In another example, automation system 100 may track when the user typically retrieves the device from the charger by storing statistics on when the charger's power consumption characteristics change to indicate no device is being charged. If the historical data is available, automation system 100 may turn the charger outlet back on approximately 15 minutes prior to the historical time the device is typically disconnected to allow the device to be "topped-off." Alternately, the charger may be enabled every 30 minutes to allow the charger to top-off the device battery routinely. This method provides the benefit of reduced energy consumption by disabling the charger whenever possible, but still providing fully charged devices.

Figure 8:
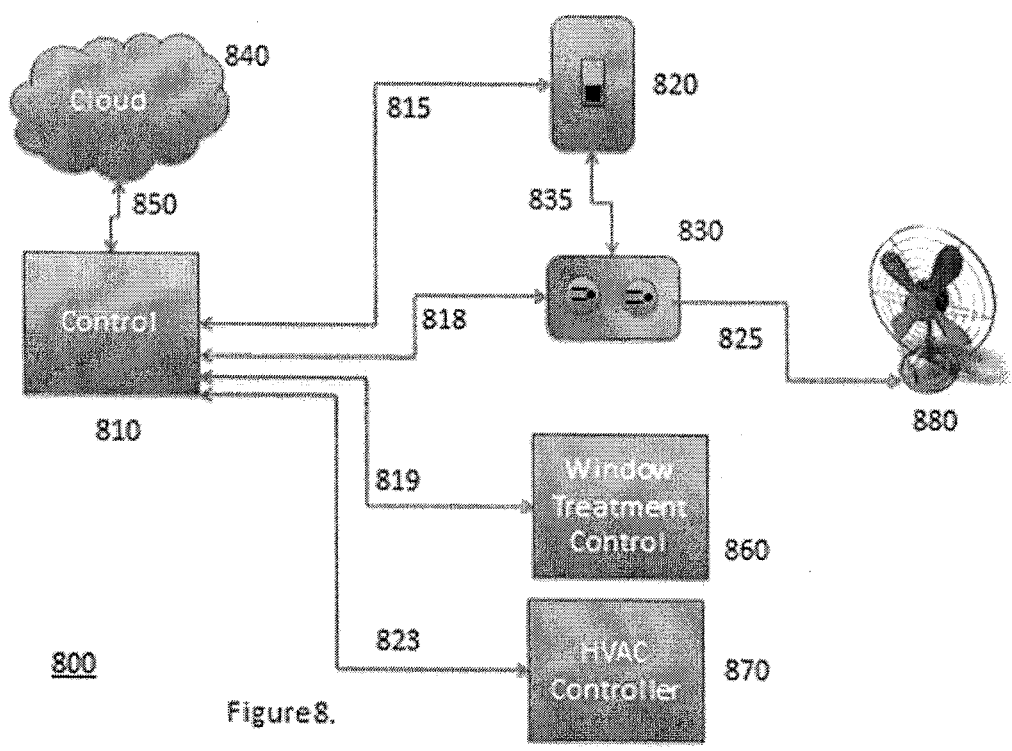
FIG. 8 depicts an exemplary building automation system including a fan plugged into an outlet.

With reference now to FIG. 8, there is depicted an exemplary building automation system 800. Automation system 810 may include any of the components and features described in connection with the other embodiments disclosed herein. For example, automation system 800 may include a control 810. Like control 110, control 810 may include any suitable computing device, including, e.g., computer, a laptop, tablet, smart phone, or another device with a user interface that can monitor and control the components of the system 800. Control 810 may be connected to the internet cloud 840 via any suitable wired or wireless network connection 850. Control 810 may provide control for the heating, ventilation and air conditioning (HVAC) system 870 via any suitable wired or wireless connection 823. Control 810 may also be connected to a controller 860 for window treatments via any suitable wired or wireless connection 819. The window treatments 860 may include LCD film on windows, automated blinds, automated curtains, or any other known window treatments which are automated to be controlled by an electric signal.

Control 810 may be also connected via wired or wireless connection 815 to a switch 820. The switch 820 may be operated to control, by wired or wireless connection 835, the operation of outlet 830, or another outlet coupled to the system 800 (not shown). System 800 may include a plurality of switches 820 and outlets 830. As explained above, switch 820 may also include sensors such as motion sensors, thermometer, camera, light sensors, or other sensors known in the art and described above. In addition, or alternatively, the sensors (not shown) may be operably coupled directly to system 800. The data from the sensors may be communicated via connection 815 to the control 810. Remote outlet 830 may be controlled by a signal delivered via, for example, connection 818 or connection 835. Outlet 830 may monitor the characteristics of the power consumed by the device attached to it, and can modify the power delivered to the device, including, e.g., enabling power, disabling power, or otherwise adjusting (e.g., reducing) the power delivered.

In the depicted example, a fan 880 may be connected to the outlet 830. The fan is operable to circulate air in an area of the building providing improved comfort for persons in the area served by the fan.

The control 810 may monitor the power consumed by the fan 880 and determine that the device is a fan, as described above. The characteristics of the consumed power and noise generated can be monitored by outlet 830, and the data may be compared with algorithms stored in 810 or with data stored in the cloud 840 to determine the identity of the fan, as described above.

In addition, the control 810 may determine that users are present in the vicinity of the fan from data gathered from the sensors (e.g., a motion sensor) associated with system 800. Further, a camera associated with system 800 may provide pictures, which can be analyzed to determine the presence of persons.

If control 810 determines that users are present in the vicinity of the fan, then control 810 may send signals to the HVAC controller 870 via connection 823 to reduce the amount of energy consumed by the HVAC. This may be done by, e.g., setting the air conditioner to a higher temperature, reducing the temperature of the heat setting, or by running the HVAC less often. Since it is likely that the person in the presence of the fan will still be in a comfortable environment. Thus, the automation system will control a first device based on an operating characteristic of a second device.

If automation system 800 detects that the fan is later turned off or unplugged, the control 810 would receive information that the fan is no longer operating, and the HVAC controller may be sent a signal to modify the HVAC setting to increase operation, since the fan will no longer be providing air circulation. Similarly, if a second fan (not shown) is plugged into any associated outlet 830 near first fan 880, the controller 810 would receive information from outlet 830 indicative of the presence of a second fan, which may cause the controller to further modify the HVAC controller 870 to further reduce operation and save energy.

Further, if the control 810 determines that there is no one in the vicinity of the fan 880 from sensor data gathered from switch 820, the control 810 may send a signal to shut off power to the fan by terminating the energy delivered to outlet 830. Similarly, if a person enters the room, which may be detected by a motion sensor, the control 810 send a signal to re-enable the power to the fan 880 at remote outlet 830.

In another embodiment, automation system 100 controlled by control 110 may determine that a pump (not shown) is connected to one of the outlets 130. Operating statistics such as, e.g., run time and power consumed, may be collected by control 110. In addition, control 110 may obtain weather information from the internet via a weather service, or from sensors connected to the control 110. If the operation of the pump deviates from the normal or historical trends, a message would be sent by control 110 to a designated user or an alarm may be generated, as discussed above. For example, if a sump pump was running continuously without rain, a message would be sent so the pump could be investigated. Possibly the pump sensor has malfunctioned causing the pump to run continuously wasting energy and hurting the reliability of the pump. Similarly, if the pump is not running during heavy rainfall, a message would also be sent.

Embodiments of the present disclosure may be used in connection with any structure, including, but not limited to, homes, offices, business, schools, churches, sporting complexes. In addition, at least certain aspects of the aforementioned embodiments may be combined with other aspects of the embodiments, or removed, without departing from the scope of the disclosure.

Other embodiments of the present disclosure will be apparent to those skilled in the art from consideration of the specification and practice of the embodiments disclosed herein. It is intended that the specification and examples be considered as exemplary only, with a true scope and spirit of the disclosure being indicated by the following claims.

We claim:

1. A building automation system, comprising:
   a controller;
   at least one outlet for providing electrical energy to a first electrical device when the first electrical device is received by the at least one outlet and to a second electrical device when the second electrical device is received by the at least one outlet, wherein the first electrical device is capable of continuing operation while receiving a reduced quantity of electrical energy, wherein the second electrical device is unable of continuing operation while receiving a reduced quantity of electrical energy;
   at least one sensor for detecting at least one characteristic of the first electrical device when the first electrical device is received by the at least one outlet and of the second electrical device when the second electrical device is received by the at least one outlet, wherein the at least one characteristic is at least one of electrical noise and power consumption detected for the respective first and second electrical devices; and
   a communication link configured to allow communication between the controller and at least one other component of the system,
   wherein the controller is configured to control delivery of electrical energy from the at least one outlet to the first electrical device when the first electrical device is received by the at least one outlet and to the second electrical device when the second electrical device is received by the at least one outlet, wherein controlling delivery of electrical energy from the at least one outlet includes permitting uninterrupted delivery of electrical energy from the at least one outlet, terminating delivery of electrical energy from the at least one outlet, and, without terminating delivery of electrical energy, reducing a quantity of electrical energy delivered from the at least one outlet,
   wherein the system is configured to determine that the first electrical device is capable of continuing operation while receiving a reduced quantity of electrical energy and that the second electrical device is unable of continuing operation while receiving a reduced quantity of electrical energy, wherein the determination is based on the at least one characteristic of the first and second electrical devices detected by the at least one sensor,
   wherein, based on the determination, the system is further configured to deliver a reduced quantity of electrical energy to the first electrical device and not to the second electrical device, and
   wherein the system is further configured to ignore an instruction from the controller to reduce a quantity of electrical energy delivered without terminating delivery of electrical energy from the at least one outlet to the second electrical device based at least in part on the at least one characteristic of the second electrical device detected by the at least one sensor.

2. The building automation system of claim 1,
   wherein the at least one sensor is a power monitor for determining the electrical energy delivered to each of the first and second electrical devices;
   wherein the controller is configured to receive power consumption data for each of the first and second electrical devices from the power monitor; and
   wherein the controller is further configured to control the delivery of electrical energy from the at least one outlet to each of the first and second electrical devices, based at least in part on the power consumption data for each of the first and second electrical devices.

3. The building automation system of claim 1, wherein the at least one sensor is a motion sensor, a camera, light sensor, sound sensor, humidity sensor, or a temperature sensor.

4. The building automation system of claim 2, further comprising at least one microprocessor configured to receive and compare the power consumption data of each of the first and second electrical devices to predetermined power consumption data of electrical devices.

5. The building automation system of claim 4, wherein one of the controller and microprocessor is configured to identify at least one of the first and second electrical devices based on the comparison of the received power consumption data to predetermined power consumption data of electrical devices.

6. The building automation system of claim 1, wherein the at least one outlet is an adaptor configured to be connected to an existing electrical outlet in a building.

7. The building automation system of claim 1, wherein the at least one outlet is directly wired to an electrical device that is directly connected to a power grid of the building.

8. The building automation system of claim 1,
wherein the at least one sensor is configured to detect an electrical noise generated by each of the first and second electrical devices and the electrical noise is communicated to the controller;
wherein the system further comprises at least one microprocessor configured to receive and compare the electrical noise to predetermined electrical noise data of electrical devices;
wherein one of the controller and the at least one microprocessor is further configured to identify each of the first and second electrical devices based on the comparison of the electrical noise to the predetermined electrical noise data of electrical devices;
wherein the controller is configured to control delivery of electrical energy from the at least one outlet to each of the first and second electrical devices, based at least in part on the identity of each of the first and second electrical devices.

9. The building automation system of claim 1, wherein the controller is configured to communicate with the Internet.

10. The building automation system of claim 1, wherein the communication link is configured to allow wireless communication between the controller and the at least one other component of the system.

11. The building automation system of claim 1, further comprising a switch operably coupled to the controller and the at least one outlet;
wherein the switch is configured to control delivery of electrical energy from the at least one outlet to each of the first and second electrical devices, based at least in part on the at least one characteristic of each of the first and second electrical devices.

12. The building automation system of claim 1, wherein the sensor is further configured to detect radiofrequencies.

13. A building automation system, comprising:
a controller configured to communicate with the Internet;
at least one outlet for providing electrical energy to a first electrical device when the first electrical device is received by the at least one outlet and to a second electrical device when the second electrical device is received by the at least one outlet, wherein the first electrical device is capable of continuing operation while receiving a reduced quantity of electrical energy,
wherein the second electrical device is unable of continuing operation while receiving a reduced quantity of electrical energy;
at least one sensor for detecting at least one characteristic of the first electrical device when the first electrical device is received by the at least one outlet and of the second electrical device when the second electrical device is received by the at least one outlet, wherein the at least one characteristic is at least one of electrical noise and power consumption of each of the first and second electrical devices, wherein the sensor is configured to generate an output based on a sensed condition,
wherein the sensor output is communicated to the Internet, the sensor output including at least one of electrical noise and power consumption detected for each of the first and second electrical devices;
wherein the system is configured to identify each of the first and second electrical devices based on the sensor output communicated to the Internet;
wherein the identity of each of the first and second electrical devices is communicated to the controller; and
a communication link configured to allow communication between the controller and at least one other component of the system;
wherein the controller is configured to control delivery of electrical energy from the at least one outlet to the first electrical device when the first electrical device is received by the at least one outlet and to the second electrical device when the second electrical device is received by the at least one outlet, wherein controlling delivery of electrical energy from the at least one outlet includes permitting uninterrupted delivery of electrical energy from the at least one outlet, terminating delivery of electrical energy from the at least one outlet, and, without terminating delivery of electrical energy, reducing a quantity of electrical energy delivered from the at least one outlet,
wherein the system is configured to determine that the first electrical device is capable of continuing operation while receiving a reduced quantity of electrical energy and that the second electrical device is unable of continuing operation while receiving a reduced quantity of electrical energy, wherein the determination is based on the identity of each of the first and second electrical devices,
wherein, based on the determination, the system is further configured to deliver a reduced quantity of electrical energy to the first electrical device and not to the second electrical device, and
wherein the system is further configured to ignore an instruction from the controller to reduce a quantity of electrical energy delivered without terminating delivery of electrical energy from the at least one outlet to the second electrical device based at least in part on the determined identity of the second electrical device.

14. The building automation system of claim 13, wherein the sensor is a power monitor, a motion sensor, a light sensor, a sound sensor, a humidity sensor, a camera, or a temperature sensor.

15. The building automation system of claim 13,
wherein the sensor output communicated to the Internet is compared to predetermined characteristics of other electrical devices;
wherein the identity of each of the first and second electrical devices is determined based on the comparison of the sensor output to the predetermined characteristics of other electrical devices;

wherein the controller is configured to control delivery of electrical energy from the at least one outlet to each of the first and second electrical devices, based at least in part on the determined identity of each of the first and second electrical devices.

16. The building automation system of claim 13, further comprising a switch operably coupled to the controller and the outlet;
wherein the switch is configured to control delivery of electrical energy from the at least one outlet based on an output from the at least one sensor.

17. A building automation system, comprising:
a controller;
a plurality of electrical devices, wherein the plurality of electrical devices includes a first electrical device and a second electrical device, the first electrical device is capable of continuing operation while receiving a reduced quantity of electrical energy, and the second electrical device is unable of continuing operation while receiving a reduced quantity of electrical energy;
at least one outlet for providing electrical energy to the first electrical device when the first electrical device is received by the at least one outlet and to the second electrical device when the second electrical device is received by the at least one outlet;
one or more sensors for detecting at least one characteristic of the first electrical device when the first electrical device is received by the at least one outlet and of the second electrical device when the second electrical device is received by the at least one outlet, wherein the at least one characteristic is at least one of electrical noise and power consumption detected for each of the first and second electrical devices; and
a communication link configured to allow communication between the controller and at least one other component of the system,
wherein the controller receives a first sensor output corresponding to at least one characteristic of the respective first and second electrical devices,
wherein the controller is configured to control the first electrical device when the first electrical device is received by the at least one outlet and the second electrical device when the second electrical device is received by the at least one outlet, wherein controlling the respective first and second electrical devices includes permitting uninterrupted delivery of electrical energy from the at least one outlet, terminating delivery of electrical energy from the at least one outlet, and, without terminating delivery of electrical energy, reducing a quantity of electrical energy delivered from the at least one outlet,
wherein the system is configured to determine that the first electrical device is capable of continuing operation while receiving a reduced quantity of electrical energy and that the second electrical device is unable of continuing operation while receiving a reduced quantity of electrical energy, wherein the determination is based on the at least one characteristic of the respective first and second electrical devices detected by the one or more sensors,
wherein, based on the determination, the system is further configured to deliver a reduced quantity of electrical energy to the first electrical device and not to the second electrical device, and
wherein the system is further configured to ignore an instruction from the controller to reduce a quantity of electrical energy delivered without terminating delivery of electrical energy from the at least one outlet to the second electrical device based at least in part on the received first sensor output corresponding to the at least one characteristic of the second electrical device.

18. The building automation system of claim 17, wherein the sensor includes a motion sensor, a light sensor, a sound sensor, a humidity sensor, a camera, or a temperature sensor.

19. The building automation system of claim 17, wherein the sensor includes a power monitor, wherein the power monitor is configured to monitor a power consumption of at least one of the plurality of electrical devices.

20. The building automation system of claim 19,
wherein the system further comprises at least one microprocessor configured to compare the power consumption of at least the first electrical device to predetermined power consumption data of electrical devices;
wherein one of the controller and microprocessor is configured to identify at least the first electrical device based on the comparison of the power consumption of at least the first electrical device to predetermined power consumption data of electrical devices.

21. The building automation system of claim 17, wherein the controller is configured to communicate with the Internet.

22. The building automation system of claim 17, wherein the communication link is configured to allow wireless communication between the controller and the at least one other component of the system.

23. The building automation system of claim 21,
wherein the first sensor output is communicated to the Internet;
wherein at least one characteristic or an identity of the first electrical device is determined and communicated to the controller based on the first sensor output communicated to the Internet.

24. The building automation system of claim 17 further comprising a switch operably coupled to the controller and the at least one outlet;
wherein the switch is configured to control delivery of electrical energy from the at least one outlet to the second electrical device when the second electrical device is received by the at least one outlet, based at least in part on the at least one characteristic of the second electrical device detected by the one or more sensors.

25. A building automation system, comprising:
a controller;
a plurality of electrical devices, wherein the plurality of electrical devices includes a first electrical device and a second electrical device, the first electrical device is capable of continuing operation while receiving a reduced quantity of electrical energy, and the second electrical device is unable of continuing operation while receiving a reduced quantity of electrical energy;
a first outlet for providing electrical energy to the first electrical device;
a second outlet for providing electrical energy to the second electrical device;
one or more sensors configured to detect at least one characteristic of each of the plurality of electrical devices when the first electrical device is received by the first outlet and the second electrical device is received by the second outlet, wherein the at least one characteristic is at least one of electrical noise and power consumption detected for each of the first and second electrical devices; and
a communication link configured to allow communication between the controller and at least one other component of the system;

wherein the system is configured to determine that the first electrical device is capable of continuing operation while receiving a reduced quantity of electrical energy and that the second electrical device is unable of continuing operation while receiving a reduced quantity of electrical energy, based on the at least one characteristic corresponding to each of the first and second electrical devices detected by the one or more sensors, wherein, based on the determination, the system is further configured to deliver a reduced quantity of electrical energy to the first electrical device and not to the second electrical device, wherein the controller is configured to control the delivery of electrical energy from the first outlet to the first electrical device when the first electrical device is received by the first outlet, wherein controlling delivery of electrical energy from the first outlet to the first electrical device includes permitting uninterrupted delivery of electrical energy from the first outlet, terminating delivery of electrical energy from the first outlet, and, without terminating delivery of electrical energy, reducing a quantity of electrical energy delivered from the first outlet; and wherein the controller is further configured to control the delivery of electrical energy from the second outlet to the second electrical device when the second electrical device is received by the second outlet, based at least in part on the at least one characteristic or an identity of the second electrical device, wherein the delivery of electrical energy from the second outlet to the second electrical device is controlled by either permitting uninterrupted delivery of electrical energy from the second outlet or reducing a quantity of electrical energy delivered, without terminating delivery of electrical energy, from the second outlet, and wherein the system is configured to ignore an instruction from the controller to reduce a quantity of electrical energy delivered, without terminating delivery of electrical energy, from the second outlet to the second electrical device based at least in part on the at least one characteristic or an identity of the second electrical device.

26. The building automation system of claim 25 wherein the sensor is a motion sensor, a camera, light sensor, sound sensor, a humidity sensor a camera, or a temperature sensor.

27. The building automation system of claim 25,
wherein the sensor is a power monitor configured to detect a plurality of electrical noises respectively generated by at least one of the plurality of the electrical devices;
wherein the building automation system is configured to identify at least one of the electrical devices based on a comparison of the detected electrical noises to predetermined electrical noise data of electrical devices.

28. The building automation system of claim 25,
wherein the sensor is a power monitor that is configured to output data relating to the power consumption of each of the electrical devices;
wherein the system is further configured to identify the electrical devices based on a comparison of the monitored power consumption of the electrical devices to predetermined power consumption data of electrical devices.

29. The building automation system of claim 25, wherein the communication link is configured to allow wireless communication between the controller and the at least one other component of the system.

30. The building automation system of claim 25, further comprising a switch operably coupled to the controller and the outlets;
wherein the switch is configured to interrupt a supply of electrical energy from the first outlet based at least in part on the at least one characteristic or identity of the first electrical device;
wherein the switch is also configured to interrupt a supply of electrical energy from the second outlet based at least in part on the at least one characteristic or the identity of the second electrical device.

* * * * *